United States Patent
Karol et al.

(10) Patent No.: US 7,463,652 B2
(45) Date of Patent: Dec. 9, 2008

(54) SYSTEM AND METHOD FOR NOTIFICATION OF INTERNET USERS ABOUT FAULTS DETECTED ON AN IP NETWORK

(75) Inventors: Mark J. Karol, Fair Haven, NJ (US); P. Krishnan, North Plainfield, NJ (US); Juan Jenny Li, South Orange, NJ (US)

(73) Assignee: Avaya, Inc., Lincroft, NJ (US)

( * ) Notice: Subject to any disclaimer, the term of this patent is extended or adjusted under 35 U.S.C. 154(b) by 880 days.

(21) Appl. No.: 10/601,229

(22) Filed: Jun. 21, 2003

(65) Prior Publication Data

US 2005/0002400 A1    Jan. 6, 2005

(51) Int. Cl.
*H04J 3/00* (2006.01)
(52) U.S. Cl. .................. 370/476; 370/241; 370/242
(58) Field of Classification Search ............... None
See application file for complete search history.

(56) References Cited

U.S. PATENT DOCUMENTS

| | | | |
|---|---|---|---|
| 6,487,200 B1* | 11/2002 | Fraser ................. | 370/389 |
| 6,657,997 B1* | 12/2003 | Lide et al. ............ | 370/356 |
| 6,819,655 B1* | 11/2004 | Gregson ............... | 370/242 |
| 6,876,657 B1* | 4/2005 | Brewer et al. ......... | 370/394 |
| 6,901,069 B2* | 5/2005 | Bastin ................. | 370/356 |
| 6,917,587 B1* | 7/2005 | Sarkar et al. ......... | 370/230 |
| 7,072,305 B1* | 7/2006 | Gregson ............... | 370/241 |
| 7,072,828 B2* | 7/2006 | Petty .................. | 704/210 |
| 7,120,122 B1* | 10/2006 | Starr et al. ........... | 370/250 |
| 7,272,552 B1* | 9/2007 | James et al. .......... | 704/215 |
| 2003/0137938 A1* | 7/2003 | Belanger et al. ...... | 370/230 |
| 2006/0122835 A1* | 6/2006 | Huart et al. .......... | 704/258 |

OTHER PUBLICATIONS

RTP: A Transport Protocol for Real-Time Applications; Audio Video Transport Working Group; H. Schulzrinne, GMD Fokus; S. Casner; Precept Software, Inc.; R. Frederick, Xerox Palo Alto Research Center, V. Jacobson, Lawrence Berkeley National Laboratory; Jan. 1996.
National Institute of Standards and Technology (NIST)—Home Page—Printed Jun. 20, 2003.

* cited by examiner

*Primary Examiner*—Wing F Chan
*Assistant Examiner*—Michael J Moore, Jr.
(74) *Attorney, Agent, or Firm*—Muncy, Geissler, Olds & Lowe, PLLC

(57) ABSTRACT

The present invention is a system and method for rapid network failure detection, identification and notification to internet users. It is particular applicable to VoIP applications where such real-time problem identification is particular valuable. It reduces failure detection time by coordinating the sending frequency of RTP and RTCP packets. These incoming packets are monitored and the failure to receive a predetermined number in a specified time window indicates that a network problem has occurred. This problem is then promptly communicated to users of the system.

20 Claims, 4 Drawing Sheets

SYSTEM AND METHOD FOR NOTIFICATION OF INTERNET USERS ABOUT FAULTS DETECTED ON AN IP NETWORK

FIELD OF THE INVENTION

The present invention is a system and method for both detecting and identifying problems on a converged internet network and informing the users and network managers of those problems in a timely manner.

BACKGROUND OF THE INVENTION

Internet Protocol (IP) networks are characterized by packet delays, jitter, losses, and even occasional hardware/software failures—to include those due to viruses and attacks. Yet, applications like Voice over IP (VoIP) are demanding underlying infrastructures to both be reliable and provide acceptable quality-of-service (QoS). Consequently, a lot of ongoing work is geared towards improving the reliability, performance, and QoS characteristics of IP networks. Much of this work involves monitoring network conditions and detecting network failures.

In the prior art there are two broad categories of network monitoring schemes. The first type, distributed monitoring, typically assumes that the measurement instrumentation can be either distributed at different points in the network or placed at the endpoints of the end-to-end path. The second way to monitor network conditions requires only one centralized observation point, which makes installation easier, but it takes longer to detect failures.

With respect to the detection of a network failure, there are two well known methods in the prior art: (i) active injection of test probes into the network, and (ii) passive sniffing of existing network traffic. Many network measurement tools send periodic roundtrip echo probes to a distant host which then responds back to the sender. These probes are usually in the form of Internet Control Message Protocol (ICMP) Echo packets and are well know in the prior art by such names as NetDyn probes, Netnow probes and Fping probes in Imeter.

In many cases, an application may be able to detect a network failure (or, in some cases, receive an explicit network notification regarding the failure) much faster than the time it takes to repair the failure (e.g., by restoration schemes). Current failure-detection methods typically notify only the network manager, primarily for maintenance purposes. Users do not normally receive alerts of network problems.

Currently in the prior art, it is possible to provide voice quality feedback to a user participating in a VoIP session. Various metrics related to RTP (Real-Time Transport Protocol) traffic could be computed by an application and presented to the user. However, current network devices do not automatically inform applications or users about network problems. These are mostly gleaned via concepts like timeouts. The emphasis in VoIP and other applications has been to deliberately hide the network and its problems from the user.

The present invention is directed to overcoming these shortcomings in the converged Network. In particular, it is directed to (i) rapid failure detection and (ii) user notification.

Rapid detection and notification of failures, long before the network is actually restored/repaired, can be exploited by users and network managers in various advantageous ways. For instance, users can decide whether to continue their calls ("on hold") or, instead, wait until the network is restored and make another call later. Also, network managers might take earlier recovery efforts, for example, to redirect existing and future calls and help prevent a bigger network outage. For instance, as the jitter/loss increases to unacceptable levels on an IP path, calls might be rerouted to a different IP path or perhaps even redirected to a non-IP network (e.g. the PSTN). The point is that once the user/manager is made aware of the network situation, they can decide what to do (or what not to do) long before the network recovers.

SUMMARY OF THE INVENTION

The present invention is directed to rapid detection of network problems and notification to users in real-time. The invention is primarily described below in the context of VoIP user notification upon network failure, a typical real-time application in which the improvements of the invention are particular valuable. However, the general concept could also be used in other scenarios.

In the case of VoIP, users would be informed of network problems promptly, thereby allowing them, for example, to decide whether to terminate their affected calls. The failure detection and notification may be specific to certain traffic sessions. That is, in certain embodiments of the invention, upon detection of a failure that the VoIP application knows will take some time to fix, the invention would provide useful feedback to the end user about the failure. It is envisioned that such feedback can take many forms: e.g., a voice or text message, or a light on the VoIP device that lights up saying, in effect, that a failure has occurred and "Network Restoration is in Progress." Additional embodiments of the invention contemplate providing various amounts of information being sent to users, including, for instance, the anticipated length of time until restoration, if known (e.g., using a standard restoration procedure).

Further embodiments of the invention utilize a "keep-alive" signal for rapid failure detection. By way of example, for VoIP, a specific manner of dynamic transmission of Real Time Transport Control Protocol (RTCP) packets can serve the role of a keep-alive signal. Normally, RTCP packets are primarily just used to provide feedback on the quality of the RTP data distribution. An important feature of the present invention is the use of a failure detection and notification component (DNC). In one embodiment of the invention this DNC is a hardware device that can be added to existing IP phones (endpoints in distributed monitoring), or placed in a network device to be shared by many endpoints like the centralized monitoring method. The DNC is not limited to a hardware device as various combinations of hardware and software can be used in implementing this feature in alternative embodiments of the invention. By use of the DNC, the invention is in effect, using both sniffing and probing methods in the failure detection; new packets are injected and they are used in failure detection along with the existing traffic.

In additional embodiments of the invention, network devices (e.g., edge routers and media gateways) provide an added value in the proposed rapid failure detection. When these devices determine network problems, they send notifications about it to end devices, which then provide the user with feedback. In alternative embodiments, the notification could be broadcast to all users, or, at the other extreme, sent to network devices that specifically maintain information about open sessions so that only those sessions are informed of the problems.

BRIEF DESCRIPTION OF THE DRAWINGS

Various embodiments of the present invention will now be described in detail in conjunction with the annexed drawings, in which.

DETAILED DESCRIPTION

The present invention is a system and method for both detecting problems on a converged network and informing the users and network managers of those problems in a timely manner.

Figure 1:
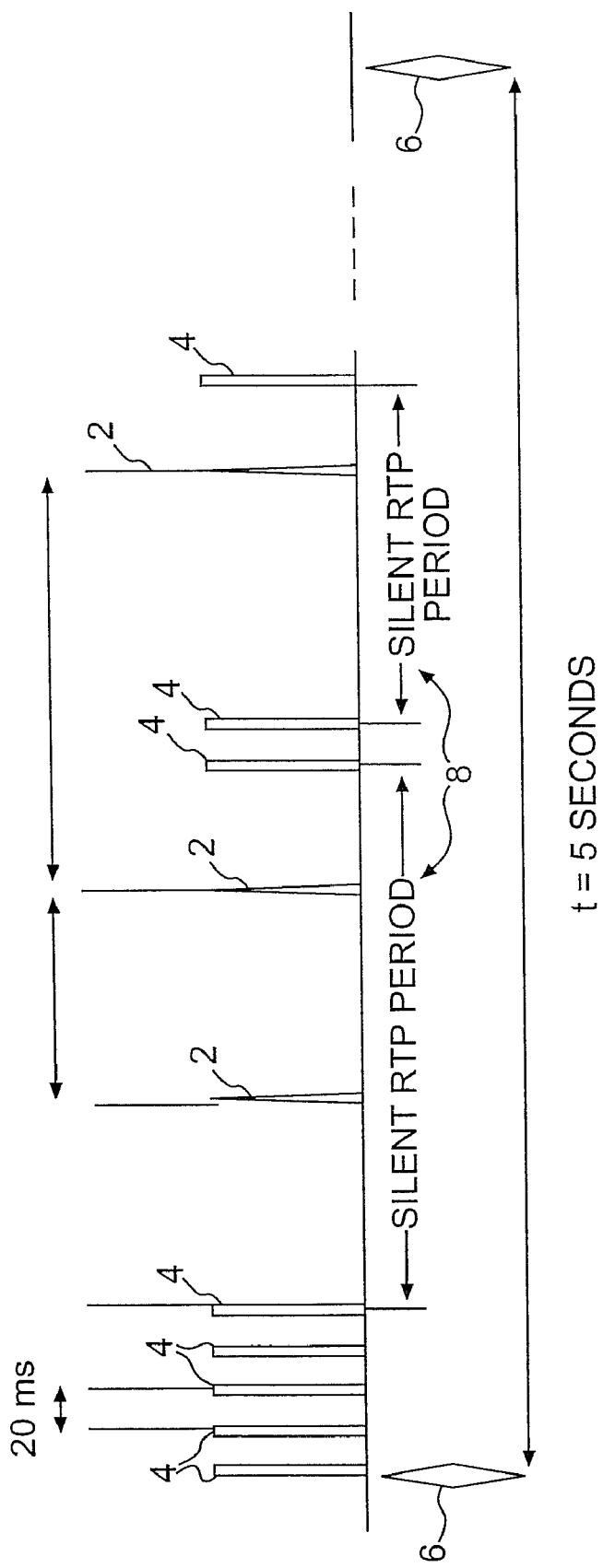
FIG. 1 illustrates an embodiment of the invention where RTCP packets are injected into the data stream during silent RTP periods.

With respect to the problem detection features, the invention, which can be either distributed or centralized, makes use of the existing VoIP infrastructure. In one embodiment of the invention, the sender increases the number of RTCP packets when the number of RTP packet decreases (during silence periods), making sure that, for example, at least one RTP or RTCP packet is sent every T seconds. FIG. 1 illustrates an example of such a RTCP packet injection scheme. As depicted in FIG. 1, additional (short) RTCP packets 2 are injected at rate R=1/T during silent periods 8 in the RTP stream. The receiver declares that a failure has occurred if neither RTP packets 4, added RTCP packets 2, nor original RTCP packets 6 are received within a window of kT seconds (k=2, 3, ... ). The receiver then notifies the users who are involved in the sessions. Further embodiments of the invention contemplate that notification be made to additional users that are not currently using the system but who might be affected if they were to attempt to set up a new call.

Since the RTP/RTCP packets may experience network jitter and loss, there is a chance that a failure will be wrongly declared (i.e., a "false alarm"). However, as soon as either an RTP or an RTCP packet is once again received, the receiver cancels its "failure announcement." This could either correct a false alarm or announce restoration after an actual failure.

In various embodiments of the present invention, the failure detection and notification component (DNC) can be placed at any of four places in the internet path: (i) inside the IP phone application, (ii) inside the RTP/RTCP stack of the IP phone, (iii) inside the edge device that connects the enterprise network to the internet, or (iv) as an independent box next to one or more IP phones or an edge device controlled by a call server.

Missing RTP and RTCP packets can be monitored at the endpoint in a distributed embodiment of the invention or in alternative embodiment at the call server in a centralized manner. The centralized method uses the call server to detect existing calling sessions and their corresponding RTP/RTCP packets. It informs the end-user device of network failures after detecting missing RTP/RTCP packets. The distributed method uses an extension to the end-user IP phone to adjust the RTP/RTCP packet transmission rate and detect missing packets.

Figure 2:
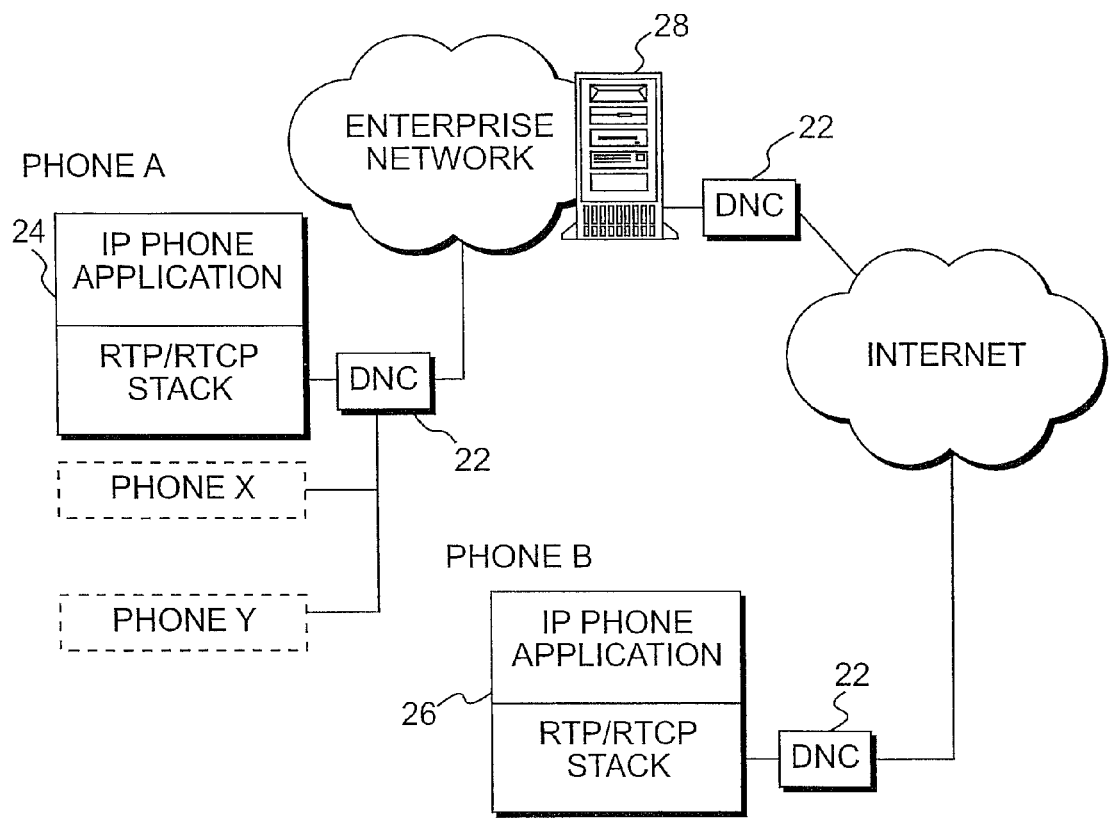
FIG. 2 illustrates the general architecture of an embodiment of the invention.

FIG. 2 depicts the general architecture of an embodiment of the present invention that employs both distributed and centralized implementation. It includes network components such as IP phones 24, 26 and edge routers 28. The DNC 22, which as noted above can be either hardware, software, or a combination thereof, can be implemented inside these devices or as an independent component.

For a distributed implementation involving Phone A, 24, and Phone B, 26, a typical failure detection and notification scenario will now be discussed. First, the DNC components of Phone A and Phone B inject some (short) RTCP packets (item 2 of FIG. 1) into the session stream whenever no RTP packets are sent (i.e., during silence periods). Both DNC components monitor the incoming RTP and RTCP packets from the other party. If a DNC component does not receive either RTP or RTCP packets (for a time period kT), it declares that a network failure occurred and attempts to notify the other party. For example, if Phone A detects a failure, it notifies Phone B that a failure occurred on the path from Phone B to Phone A. The user of Phone B will be notified that no packets can be sent from Phone B to Phone A, even if the path from Phone A to Phone B is okay. If Phone B also detects a failure, then a failure is detected that affects the traffic in both directions.

For a centralized implementation, a typical scenario would also make use of the edge device 28 and its corresponding call server. In alternative embodiments of the invention, the DNC component 22 can be implemented (i) inside the call server/media gateway application, (ii) inside the call server RTP/RTCP stack, or (iii) as an independent box next to the edge device. When a call between Phone A, 24 and Phone B, 26 occurs, they both register their sessions with the call server. The server monitors physical, link, and IP layer connectivity, as well as RTP and RTCP traffic between Phone A and Phone B. When it detects network failures, it notifies all affected sessions and endpoints. Even if the affected endpoints are not active, failure notification can prevent users from making unnecessary (failed) calls, which saves the users time and money.

The present invention realizes multiple benefits over the prior art, to include reduced failure detection time and improved detection reliability. Its applications include early failure recovery by notifying network managers and giving users a choice of actions. For instance, as the jitter/loss increases to unacceptable levels on an IP path, calls might be rerouted to a different IP path or perhaps even redirected to a non-IP network (e.g. the PSTN).

Although network managers can improve reliability by adding alternate routing paths before outages occur, a more effective way to manage and ensure the converged network reliability is early detection and notification. The present invention enables round-the-clock failure notification.

In additional embodiments of the invention, failure information can be used to inform a "smart router" of failures on a certain path so that a different path will be selected for future transmissions. Moreover, where traffic on a network involves multiple source destination pairs and routing information is available, the real-time identification of occurrences of failures can be used to identify a component of the transmission path that is causing the problem. By way of example, a particular router that starts dropping packets would be identified when it is noted that paths containing that particular router are experiencing problems. This identification of defective router is useful in both effecting its repair and in avoiding its use until such repair have been made.

Figure 3:
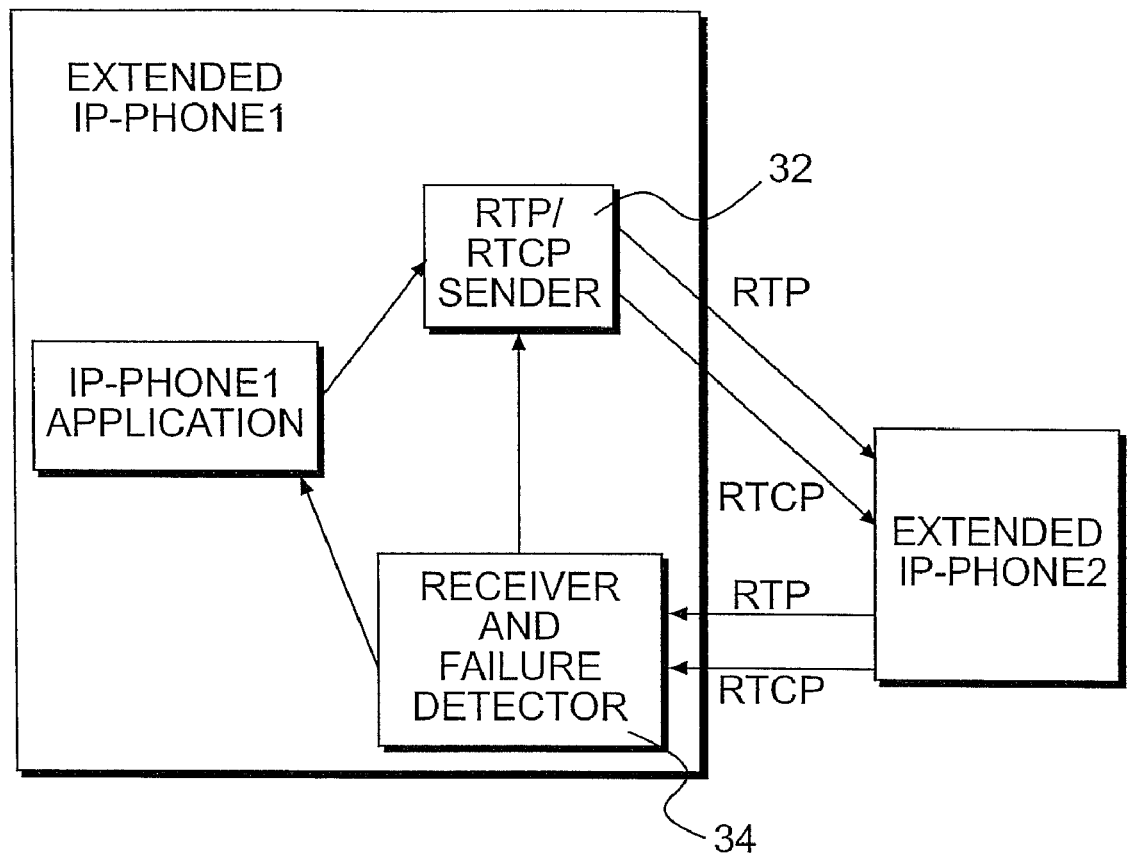
FIG. 3 illustrates an embodiment of the invention where the failure detector is co-located with the users IP phone.

FIG. 3 illustrates an embodiment in which the distributed method is implemented at the end-user applications. A typical DNC component includes two major components: a RTP/RTCP sender for sending additional RTCP packets, and a failure detector for detecting and notifying failures to the other party. The RTP/RTCP sender is designed to increase the number of RTCP packets when the number of RTP packet decreases (during silence periods). If neither RTP nor RTCP packets are received during a time interval kT, the failure detector declares an incoming network failure. It sends a feedback to the RTP/RTCP sender to transmit an additional RTCP packet to the other party. Once the other party receives such a failure notification RTCP packet, it can notify its user that there is a failure in the sending of packets. If it does not receive the notification, a two-way network failure is detected and both users will be notified.

A further embodiment of the invention permits the call session manager of a server to keep track of the RTP and RTCP traffic on each session and thereby detect failures. An active end-user notification can be made from a network device (e.g., an edge router or media gateway) to an application that the user is interacting with, which then signals this notification to the user. If these devices determine that a network problem has occurred (e.g., from network or reconfiguration messages that they receive), they can send notifications about it to end devices, which can then provide the users with appropriate feedback. The notifications could, for instance, be broadcast to all end devices. Alternatively, if network devices maintain information about open RTP sessions (which may require some capability like wire-speed string matching), then they can selectively notify only users in those sessions. This feature can be readily implemented in an embodiment of the invention that introduces packets into the RTCP sessions. In additional embodiments it is contemplated that since a network problem (e.g., reconfiguration) may not necessarily affect a particular session, end applications must use such network notifications in conjunction with other factors (like not receiving packets for some time period) when deciding to notify the end user of a network problem.

Bandwidth and Cost Tradeoffs/Issues

One aspect of the invention that will now be discussed is the tradeoffs between the rate of inserted RTCP traffic and the time it takes to detect failures. In general, the more RTCP packets are injected, the faster the failure detection will be (but with higher overhead).

In one embodiment of the invention the additional "keep-alive" RTCP packets can be sent as Source Descriptor (SDES) packets with a source count (SC) of 0. The size of the data portion of such a packet is only four octets (excluding the 8-octet UDP and 20-octet IP headers). In comparison, the sender report RTCP packet is larger and requires statistics collection. In alternative embodiments of the invention, application-defined RTCP packets may also be considered for this "keep-alive" purpose. An example of such packets are described in an article by H. Schulzrinne, et al., entitled "RTP: A Transport Application for Real-Time Applications," IETF RFC 1889, January 1996, (at Section 6.6); which article is hereby incorporated by reference. The overhead associated with the inclusion of such additional packets is minimal since the additional injected RTCP packets are only sent when regular RTP packets are not (during silence periods, for example) and very short RTCP packets are used for this keep-alive function. In particular, note that the SDES packet is smaller than an RTP packet, given the mandatory 12-octet RTP header. Furthermore, the SDES packets will be sent at a lower rate than the RTP packets. Hence, any pre-negotiated bandwidth limitations should not be exceeded.

To determine preferred RTCP rates in actual implementations, the following formula is utilized which relates the RTCP rate to RTP rate, failure detection time, and overhead (including UDP and IP headers). The following notations are utilized:

i. Injected RTCP Packets: Rate=R packets/sec; Length 32 (i.e., 4+8+20) octets ii. RTP Packets: Rate=r packets/sec; Length=header_length (RTP+UDP+IP)+c=40+c (c denotes the payload length, which is a function of the codec)

iii. Regular RTCP Packets: Rate=⅕ packets/sec; Length=header_length+w=28+52=80 (w denotes the length of the sender statistics report)

iv. Percentage of silence during a call: D

With this notation, the total additional injected RTCP overhead can be represented as:

$$32RD/[r(1-D)(40+c)+32RD+(28+w)/5].$$

Also, the failure detection time is k/R, where k is the number of missing RTCP intervals before a failure is declared. By way of example in the situation in which, (i) RTCP packets are injected every 500 ms during silence periods (R=0.5), (ii) the codec generates RTP packets every 20 ms (r=50) with 160 octets of payload, and (iii) the call is silent 50% of the time (D=0.5)—i.e., while the other participant is talking. Then the injected RTCP overhead is only 0.16 percent and the failure detection time is 1.5 seconds if k=3 is selected as the threshold for declaring a failure. This overhead is so small that it is almost negligible to overall network traffic.

An alternative embodiment of the invention generates this keep-alive signal by simply periodically inserting RTCP packets. That is, rather than adding these packets during silence periods, each additional RTCP packet is sent at a fixed interval, e.g. 500 ms, irrespective of what other packets are being transmitted.

Prototype Implementation

Figure 4:
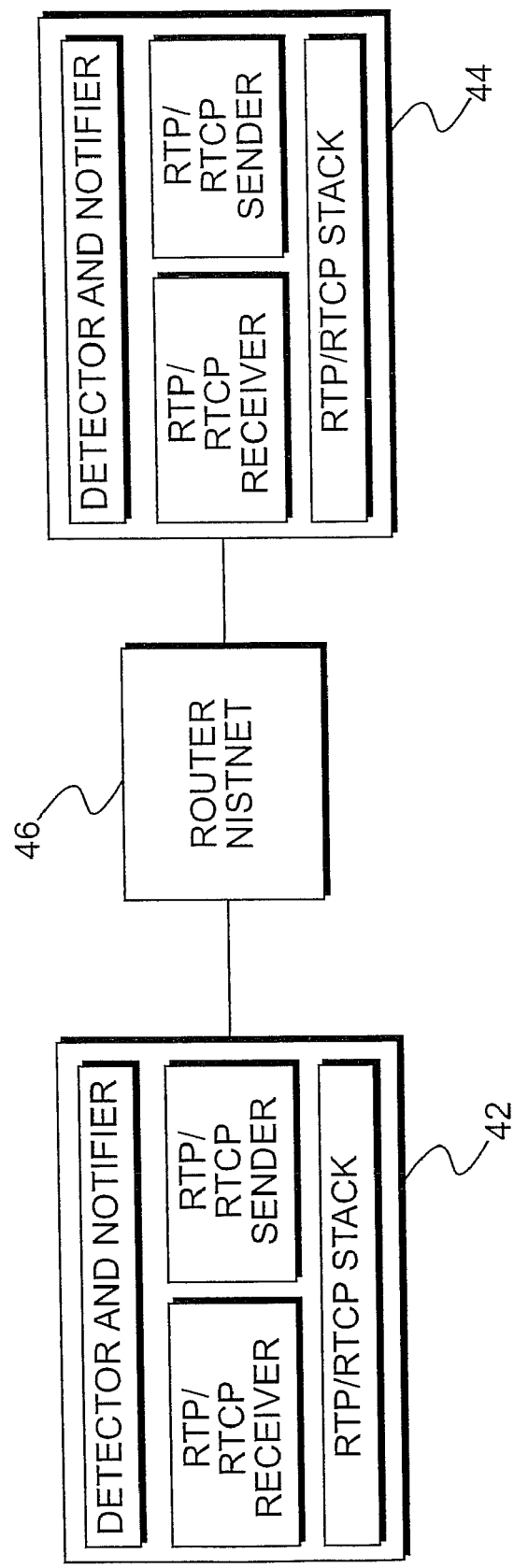
FIG. 4 illustrates a prototype implementation of an embodiment of the present invention.

Statistical benefits of the invention will now be discussed with respect to a prototype implementation of the invention. This prototype was implemented on a simulated IP phone application. FIG. 4 shows the setting and the components of the implementation. It includes two IP soft phones 42, and 44 and one router 46, all of which ran on Linux machines. A well-known, freeware software "NISTnet" (incorporated herein by reference) is installed on the router 46 to emulate network failure and QoS (delay, loss, jitter) impairments. The sender of the application was modified to insert RTCP packets during silence periods, and the receiver was modified to wait for additional RTCP packets during silence periods. A new component, detector and notifier, was added to the application at each phone location to decide when failure occurs and to signal the failure to the user. The various components were synchronized so that accurate measurements could be made of the detection times.

On this implementation-platform, a set of failure detection and notification experiments were performed. Two types of experiments were conducted to study the failure detection times and the false-alarm probabilities:

A. In this set of experiments, network failures were emulated and failure detection times were measured. A detection time equal to four times the injected RTCP intervals (I/R) was used (i.e., k=4). For each RTCP rate, the detection experiment was repeated 10 times to obtain an average detection time and standard deviation. Table 1 shows the results. In each experiment, the detection time is dependent on whether the failure occurs during a talk spurt (when the RTP packets were spaced 20 msec apart) or during a silence period (when the RTCP packets were spaced further apart). Thus, as expected, the average detection time was close to (and less than) k/R.

TABLE 1

| Experiments A | | |
|---|---|---|
| RTCP rate (ms) (1/R) | Average Detection Time (ms) | Deviation (ms) |
| 100 | 368 | 47.1 |
| 200 | 719 | 82.8 |
| 500 | 1735 | 191 |
| 1000 | 3222 | 510 |
| 2000 | 7050 | 736 |

B. This set of experiments examined the effects of packet loss on the probability that a false-alarm failure is declared. The experiment was repeated 10 times for each value of k. Table 2 lists the number of times that a false alarm occurred during a 10-minute call. During silence periods, RTCP, packets were injected every 200 ms. A (false-alarm) failure was declared if k successive RTCP packets were dropped by the network and if the corresponding silence period (i.e., no transmission of RTP packets) lasted more than k times 200 ms.

TABLE 2

| Experiments B | | |
|---|---|---|
| Packet Loss (%) | k | Number of False Alarms |
| 5 | 2 | 10 |
| 5 | 3 | 0 |
| 5 | 4 | 0 |
| 10 | 2 | 10 |
| 10 | 3 | 0 |
| 10 | 4 | 0 |

These and our other experiments have shown the effectiveness of the present invention.

It will be understood that the forgoing description of the invention is by way of example only, and variations will be evident to those skilled in the art without departing from the scope of the invention, which is as set out in the appended claims.

What is claimed is:

1. A method for detecting a potential problem in the transmission of a sequence of packets via an Internet Protocol (IP) network, said transmission occurring from a signal origin point to a signal destination point, said method comprising the steps of:
   (a) examining an original packet sequence to be sent from said origin point, said original packet sequence comprising periods of silence between packets to be transmitted, to determine one or more extended silence periods wherein said extended silence period exceeds a predetermined time duration;
   (b) introducing a keep-alive signal packet into each of said extended silence periods thereby converting said original packet sequence into a modified packet sequence;
   (c) transmitting said modified packet sequence over the IP network; and,
   (d) detecting whenever at least one packet of said modified packet sequence has not been received at the signal destination point during a specified time interval,
   wherein said original packet sequence comprises RTP packets and said keep-alive signal comprises RTCP packets.

2. The method of claim 1 wherein said keep-alive signal packet consists of a source description (SDES) RTCP packet with a source count (SC) of 0.

3. The method of claim 2 further comprising the step of notifying individual users at both the signal origin point and the signal destintation point of the potential problem with the IP network.

4. The method of claim 3 wherein said notification comprises the step of providing an estimated time to repair.

5. The method of claim 2 further comprising the step of notifying all individuals currently active on the IP network of the potential problem with the IP network.

6. The method of claim 2 further comprising the step of notifying all users on the IP network of the potential problem with the IP network.

7. The method of claim 1 wherein said IP network is administered by a network manager, and said method further comprises the step of notifying the network manager of the potential problem with the network.

8. The method of claim 7 wherein a plurality of transmissions of sequences of packets is sent via an identifiable routing path over the IP network, said routing path comprising multiple IP network components; said method further comprising the step of:
   (e) detecting a plurality of potential problems; and,
   (f) identifying a component common to said detected potential problems.

9. A method for detecting a potential problem in the transmission of a sequence of packets via an Internet Protocol (IP) network, said transmission occurring from a signal origin point to a signal destination point, said method comprising the steps of:
   (g) introducing, at a fixed period, a keep-alive signal packet into an original packet sequence, thereby converting said original packet sequence into a modified packet sequence;
   (h) transmitting said modified packet sequence over the IP network; and,
   (i) detecting whenever at least one packet of said modified packet sequence has not been received at the signal destination-point during a specified time interval,
   wherein said keep-alive signal comprises RTCP packets.

10. A method for notifying users of an IP network of a problem in the transmission of a sequence of packets on said IP network, said transmission occurring from a signal origin point to a signal destination point, said method comprising the steps of:
   introducing a keep-alive signal packet into silence periods of an original packet sequence, thereby converting said original packet sequence into a modified packet sequence, wherein said keep-alive signal packet consists of a source description (SDES) RTCP packet with a source count (SC) of 0;
   transmitting said modified packet sequence over the IP network;
   (j) detecting whenever at least one packet of said modified packet sequence has not been received at the signal destination point during a specified time interval; and,
   (k) notifying the users of said problem.

11. A system for detecting a potential problem in the transmission of a sequence of packets via an Internet Protocol (IP) network, said transmission occurring from a signal origin point to a signal destination point, said system comprising:
   (I) means for examining an original packet sequence to be sent from said origin point, said original packet sequence comprising periods of silence between packets to be transmitted, to determine one or more extended silence periods wherein said extended silence period exceeds a predetermined time duration; (m) means for introducing a keep-alive signal packet into each of said extended silence periods thereby converting said original packet sequence into a modified packet sequence; (n) means for transmitting said modified packet sequence over the IP network; and, (o) means for detecting whenever at least one packet of said modified packet sequence has not been received at the signal destination point during a specified time interval, wherein said original packet sequence comprises RTP packets and said keep-alive signal comprises RTCP packets.

12. The system of claim 11 wherein said original packet sequence comprises VoIP data.

13. The system of claim 12 further comprising a means for notifying individual users at both the signal origin point and the signal destination point of the potential problem with the IP network.

14. The system of claim 13 wherein said means for notification comprises a means for providing an estimated time to repair.

15. The system of claim 12 further comprising a means for notifying all individuals currently active on the IP network of the potential problem with the IP network.

16. The system of claim 12 further comprising a means for notifying all users on the IP network of the potential problem with the IP network.

17. The system of claim 16 wherein said IP networks is administered by a network manager, and said system further comprises a means for notifying the network manager of the potential problem with the network.

18. The system of claim 17 wherein a plurality of transmissions of sequences of packets is sent via an identifiable routing path over the IP network, said routing path comprising multiple IP network components; said system further comprising:

(p) means for detecting a plurality of potential problems; and, (q) means for identifying a component common to said detected potential problems.

19. A system for detecting a potential problem in the transmission of a sequence of packets via an Internet Protocol (IP) network, said transmission occurrinq from a signal origin point to a signal destination point, said system comprising:

(r) means for introducing, at a fixed period, a keep-alive signal packet into an original packet sequence, thereby converting said original packet sequence into a modified packet sequence;

(s) means for transmitting said modified packet sequence over the IP network; and, (t) means for detecting whenever at least one packet of said modified packet sequence has not been received at the signal destination point during a specified time interval, wherein said keep-alive signal comprises RTCP packets.

20. A system for notifying users of an IP network of a problem in the transmission of a sequence of packets on said IP network, said transmission occurring from a signal origin point to a signal destination point, said system comprising:

means for introducing a keep-alive signal packet into silence periods of an original packet sequence, thereby converting said original packet sequence into a modified packet sequence, wherein said keep-alive signal packet consists of a source description (SDES) RTCP packet with a source count (SC) of 0;

means for transmitting said modified packet sequence over the IP network;

means for detecting whenever at least one packet of said sequence has not been received at the signal destination point during a specified time interval; and, means for notifying the users of said problem.

* * * * *